(12) United States Patent
Moura et al.

(10) Patent No.: US 10,684,017 B2
(45) Date of Patent: Jun. 16, 2020

(54) PASSAGE GEOMETRY FOR GAS TURBINE ENGINE COMBUSTOR

(71) Applicant: United Technologies Corporation, Farmington, CT (US)

(72) Inventors: Dennis M. Moura, South Windsor, CT (US); Jonathan J. Eastwood, Newington, CT (US); Lee E. Bouldin, Woodbridge, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 649 days.

(21) Appl. No.: 15/027,082

(22) PCT Filed: Oct. 21, 2014

(86) PCT No.: PCT/US2014/061572
§ 371 (c)(1),
(2) Date: Apr. 4, 2016

(87) PCT Pub. No.: WO2015/108584
PCT Pub. Date: Jul. 23, 2015

(65) Prior Publication Data
US 2016/0238253 A1    Aug. 18, 2016

Related U.S. Application Data

(60) Provisional application No. 61/895,139, filed on Oct. 24, 2013.

(51) Int. Cl.
*F23R 3/06* (2006.01)
*F23R 3/50* (2006.01)
*F23R 3/00* (2006.01)

(52) U.S. Cl.
CPC ............ *F23R 3/06* (2013.01); *F23R 3/002* (2013.01); *F23R 3/50* (2013.01);
(Continued)

(58) Field of Classification Search
CPC ................... F23R 3/002; F23R 3/06; F23R 2900/03041–44
See application file for complete search history.

(56) References Cited

U.S. PATENT DOCUMENTS 4,132,066 A * 1/1979 Austin, Jr. ............... F23R 3/06
60/752
4,622,821 A * 11/1986 Madden ................... F23R 3/06
60/755
(Continued)

FOREIGN PATENT DOCUMENTS

JP          59013829          1/1984

OTHER PUBLICATIONS

Extended EP Search Report dated Oct. 27, 2016.

*Primary Examiner* — Todd E Manahan
*Assistant Examiner* — Katheryn A Malatek
(74) *Attorney, Agent, or Firm* — Getz Balich LLC

(57) ABSTRACT

An annular grommet is provided for a wall assembly of a combustor section of a gas turbine engine. The annular grommet includes a wall that at least partially defines a chamber. A wall assembly within a gas turbine engine includes a liner panel with a hot side and a cold side. The wall assembly also includes an annular grommet with a passage wall and a flange wall transverse to the passage wall. The annular grommet includes a chamber therein. A method of cooling a wall assembly within a gas turbine engine includes injecting air through a chamber in an annular grommet.

7 Claims, 18 Drawing Sheets

(52) U.S. Cl.
CPC ............... *F23R 2900/00017* (2013.01); *F23R 2900/00018* (2013.01); *F23R 2900/03041* (2013.01); *F23R 2900/03044* (2013.01); *F23R 2900/03045* (2013.01); *Y02T 50/675* (2013.01)

(56) References Cited

U.S. PATENT DOCUMENTS

| | | | |
|---|---|---|---|
| 4,887,432 A * | 12/1989 | Mumford | F23R 3/06 60/759 |
| 6,205,789 B1 | 3/2001 | Patterson et al. | |
| 6,470,685 B2 | 10/2002 | Pidcock et al. | |
| 6,901,757 B2 | 6/2005 | Gerendas | |
| 7,065,971 B2 | 6/2006 | Bellucci et al. | |
| 7,093,441 B2 | 8/2006 | Burd et al. | |
| 7,146,815 B2 | 12/2006 | Burd | |
| 7,363,763 B2 | 4/2008 | Coughlan, III et al. | |
| 7,849,694 B2 | 12/2010 | Dahlke et al. | |
| 7,954,325 B2 | 6/2011 | Burd et al. | |
| 8,015,829 B2 | 9/2011 | Coughlan, III et al. | |
| 8,091,367 B2 | 1/2012 | Alkabie | |
| 8,113,004 B2 | 2/2012 | Carlisle et al. | |
| 8,256,224 B2 | 9/2012 | Garry et al. | |
| 8,307,657 B2 | 11/2012 | Chila | |
| 8,448,443 B2 | 5/2013 | Berry et al. | |
| 2004/0104538 A1 | 6/2004 | Pidcock et al. | |
| 2012/0006031 A1 | 1/2012 | Lebegue et al. | |
| 2013/0025288 A1 | 1/2013 | Cunha et al. | |
| 2013/0031783 A1* | 2/2013 | DiCintio | F23R 3/06 29/890.02 |
| 2013/0255269 A1 | 10/2013 | McKenzie et al. | |

* cited by examiner

PASSAGE GEOMETRY FOR GAS TURBINE ENGINE COMBUSTOR

CROSS-REFERENCE TO RELATED APPLICATION

This application claims priority to PCT Patent Application No. PCT/US14/061572 filed Oct. 21, 2014, which claims priority to U.S. Patent Application No. 61/895,139 filed Oct. 24, 2013, which are hereby incorporated herein by reference in their entireties.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section typically includes an outer support shell lined with heat shields, often referred to as floatwall liner panels, which are attached to the outer shell with studs and nuts. In certain arrangements, dilution passages through the liner panels and support shell direct dilution air into the combustion gases. In addition to the dilution passages, the outer shell may also have relatively smaller air impingement passages to direct cooling air between the liner panels and the support shell to impinge upon the cold side of the liner panels. This cooling air then exits effusion passages through the liner panels to form a cooling air film on a hot side of the floatwall panels that serves as a barrier to thermal damage.

One particular region where localized combustor hot spots may arise is around the dilution passages. The dilution passages inject relative lower temperature air into the swirling fuel-rich cross flow for combustion. As the air penetrates into the fuel-rich cross-stream, heat release takes place along the reaction front to form high temperature regions around the dilution passages. A stagnation region along an upstream side of the dilution passages may also form a higher pressure environment such that cross flow momentum deflects the incoming dilution air jet. The combination of high pressure and the deflection of the incoming dilution air jet may form a high temperature recirculation region within the dilution passage.

A lower velocity region of flow along the perimeter of the dilution passage may also be highly susceptible to inflow of hot combustion gas products. The inflow of these products can occur within a localized ingestion region and may result in a durability concern because a low temperature boundary condition is replaced by high temperature gases.

SUMMARY

A grommet for a wall assembly of a combustor section of a gas turbine engine, according to one disclosed non-limiting embodiment of the present disclosure, includes a wall that at least partially defines a dilution passage along an axis and at least one chamber. This chamber at least partially surrounds the dilution passage.

In a further embodiment of the present disclosure, the chamber includes an outlet passage generally transverse to the dilution passage.

In a further embodiment of any of the foregoing embodiments of the present disclosure, the chamber includes an outlet passage directed into the a dilution passage.

In a further embodiment of any of the foregoing embodiments of the present disclosure, the wall is an annular passage wall.

In a further embodiment of any of the foregoing embodiments of the present disclosure, the annular passage wall includes a step.

In a further embodiment of any of the foregoing embodiments of the present disclosure, an overhang is included adjacent to the step.

In a further embodiment of any of the foregoing embodiments of the present disclosure, a feature is included that is at least partially formed along the step along an axis of the dilution passage.

In a further embodiment of any of the foregoing embodiments of the present disclosure, the chamber is segmented.

In a further embodiment of any of the foregoing embodiments of the present disclosure, the wall includes an annular passage wall and a flange wall that extends transversely from the passage wall. The passage wall includes an inlet passage in communication with the chamber.

A wall assembly within a gas turbine engine, according to another disclosed non-limiting embodiment of the present disclosure, includes a liner panel with a hot side and a cold side and a grommet with a passage wall and a flange wall transverse to the passage wall. The grommet at least partially defines a dilution passage along an axis and at least one chamber that at least partially surrounds the dilution passage.

In a further embodiment of any of the foregoing embodiments of the present disclosure, the stepped area around the annular grommet and the stepped area within the flange extends for less than three hundred and sixty degrees.

A method of cooling a wall assembly within a gas turbine engine, according to another disclosed non-limiting embodiment of the present disclosure, includes communicating air into a chamber in an annular grommet.

In a further embodiment of any of the foregoing embodiments of the present disclosure, the method includes ejecting the air from the chamber generally parallel to a hot side of a liner panel from the annular grommet.

In a further embodiment of any of the foregoing embodiments of the present disclosure, the method includes ejecting the air adjacent to recessed area of the liner panel.

In a further embodiment of any of the foregoing embodiments of the present disclosure, the method includes ejecting the air from the chamber into a dilution passage formed by the annular grommet.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows.

DETAILED DESCRIPTION

Figure 1:
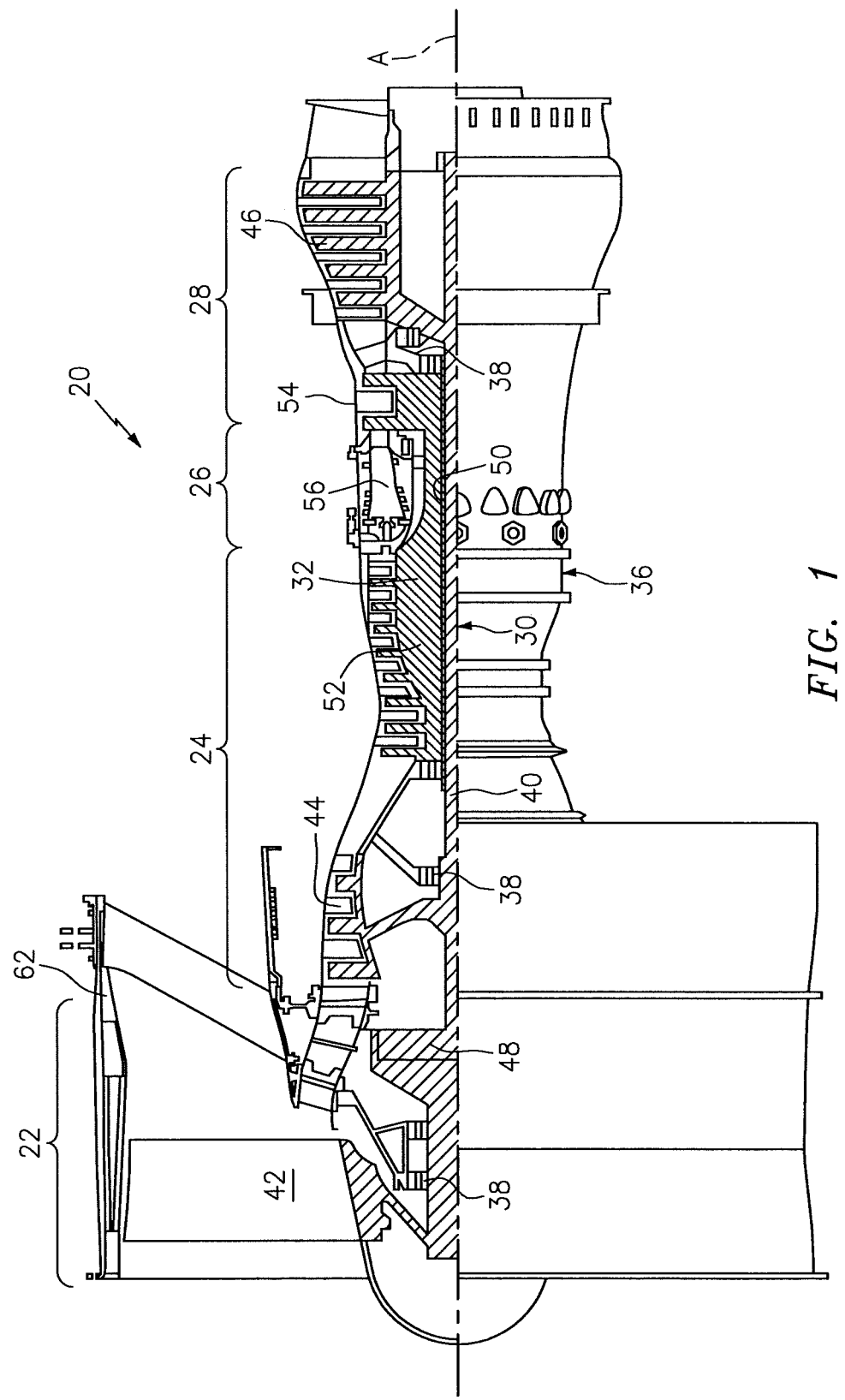
FIG. 1 is a schematic cross-section of an example gas turbine engine architecture.
Figure 2:
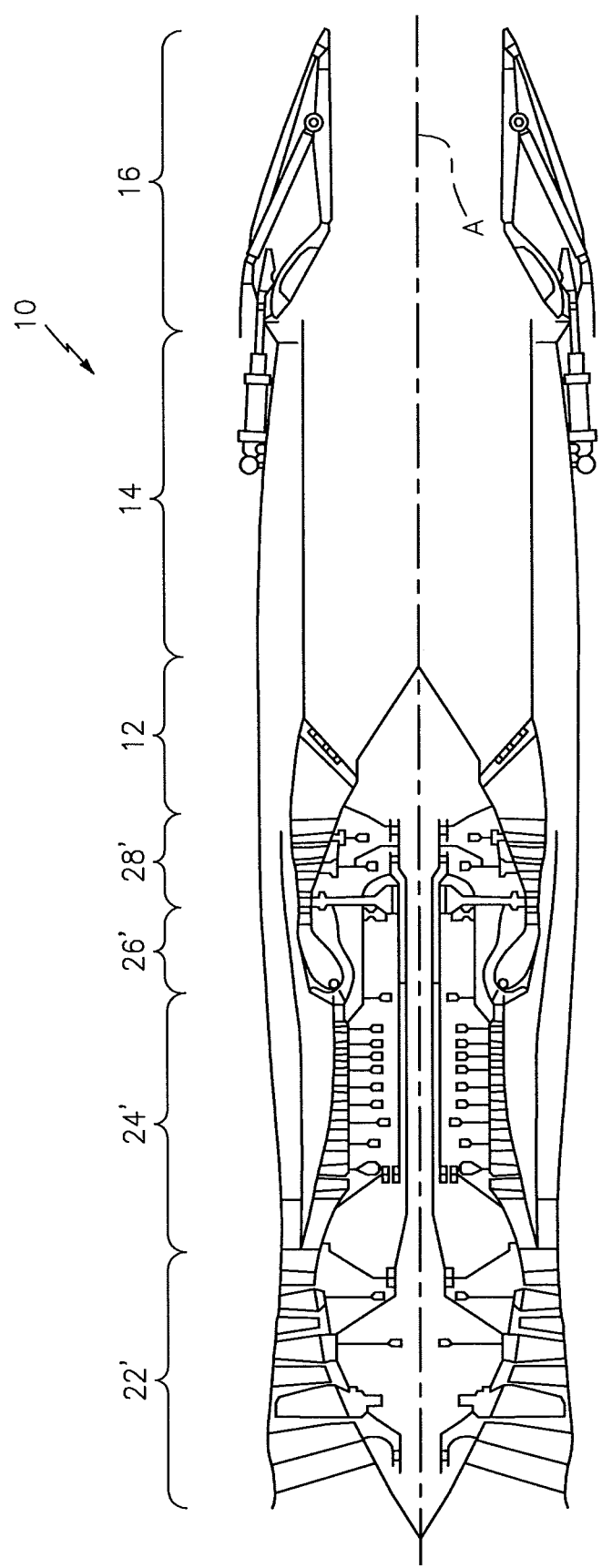
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 10 might include an augmentor section 12, an exhaust duct section 14 and a nozzle section 16 in addition to the fan section 22', compressor section 24', combustor section 26' and turbine section 28' (see FIG. 2) among other systems or features. The fan section 22 drives air along a bypass flowpath and into the compressor section 24 to drive core air along a core flowpath. The core air is compressed then communicated into the combustor section 26 for downstream expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans with an intermediate spool.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as shown in FIG. 1 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

Figure 3:
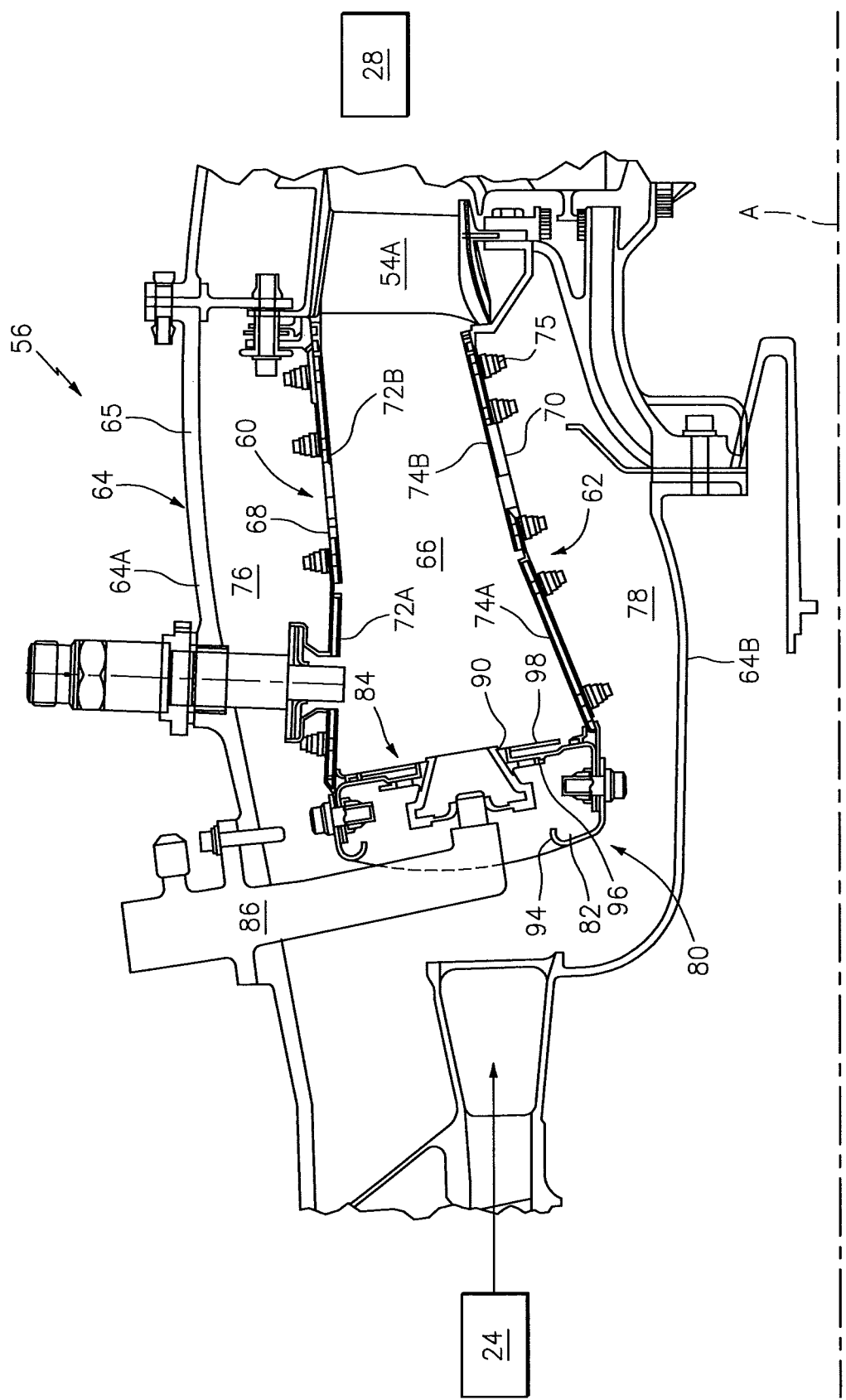
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with a radially outer combustor wall assembly 60, a radially inner combustor wall assembly 62 and a diffuser case module 64 therearound. The outer combustor wall assembly 60 and the inner combustor wall assembly 62 are spaced apart such that an annular combustion chamber 66 is defined therebetween.

More particularly, the outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto. Each of the liner panels 72, 74 may be generally rectilinear and curved with respect to the engine axis A, and manufactured of, for example, a nickel based super alloy, ceramic or other temperature resistant material and are arranged to form a liner array. In the liner array, a multiple of forward liner panels 72A and a multiple of aft liner panels 72B are circumferentially staggered to line the outer shell 68. A multiple of forward liner panels 74A and a multiple of aft liner panels 74B are circumferentially staggered to also line the inner shell 70.

The combustor 56 further includes a forward assembly 80 immediately downstream of the compressor section 24 to receive compressed airflow therefrom. The forward assembly 80 generally includes an annular hood 82 and a bulkhead assembly 84 that supports a multiple of swirlers 90 (one shown). Each of the swirlers 90 is circumferentially aligned with one of a multiple of fuel nozzles 86 (one shown) and a respective hood port 94.

The bulkhead assembly 84 includes a bulkhead support shell 96 secured to the combustor walls 60, 62, and a multiple of circumferentially distributed bulkhead liner panels 98 secured to the bulkhead support shell 96 around each respective swirler opening 92. The bulkhead support shell 96 is generally annular and the multiple of circumferentially distributed bulkhead liner panels 98 are segmented, typically one to each fuel nozzle 86 and swirler 90.

The annular hood 82 extends radially between, and is secured to, the forwardmost ends of the combustor wall assemblies 60, 62. The multiple of circumferentially distributed hood ports 94 facilitate the direction of compressed air into the forward end of the combustion chamber 66 through each respective swirler 90. Each fuel nozzle 86 may be secured to the diffuser case module 64 to project into the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted adjacent to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation.

Figure 4:
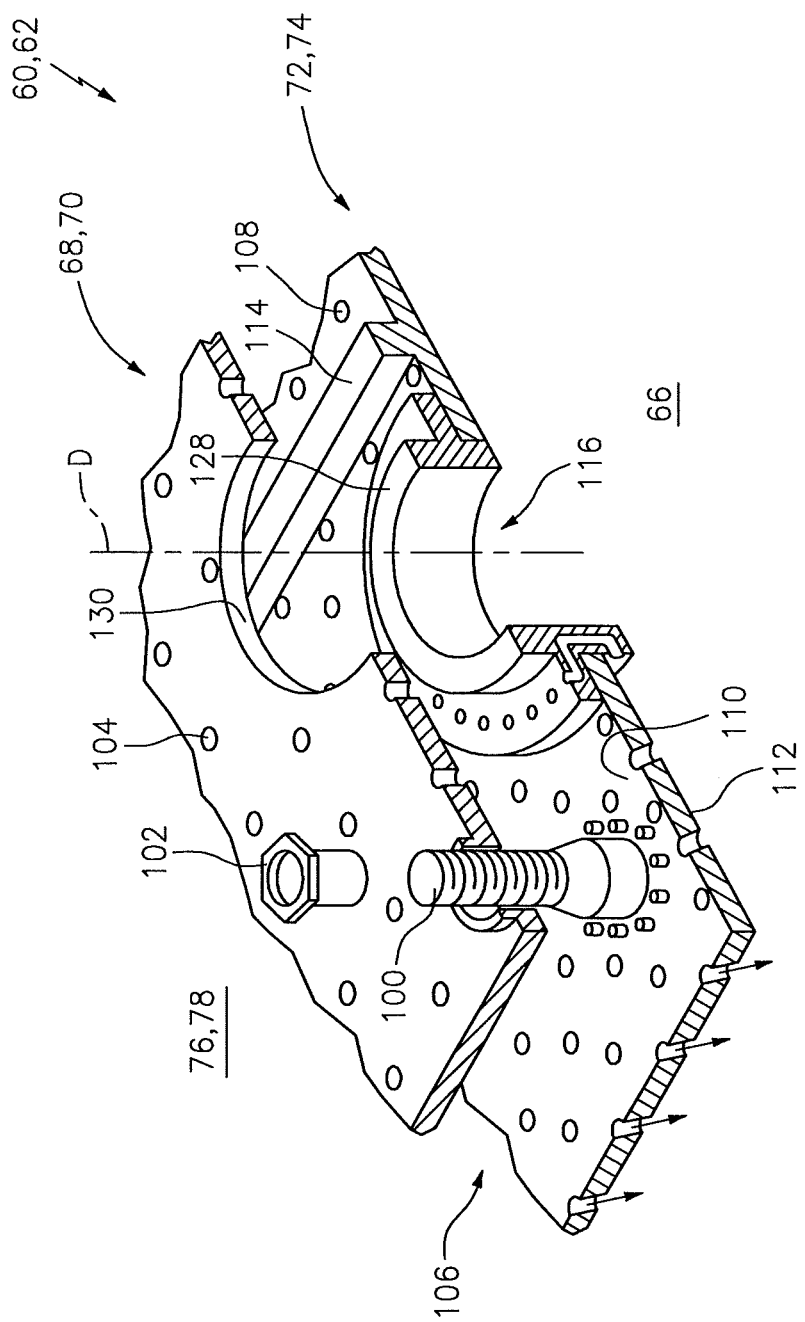
FIG. 4 is an exploded view of a wall assembly with a dilution passage formed by an annular grommet according to one disclosed non-limiting embodiment.
Figure 5:
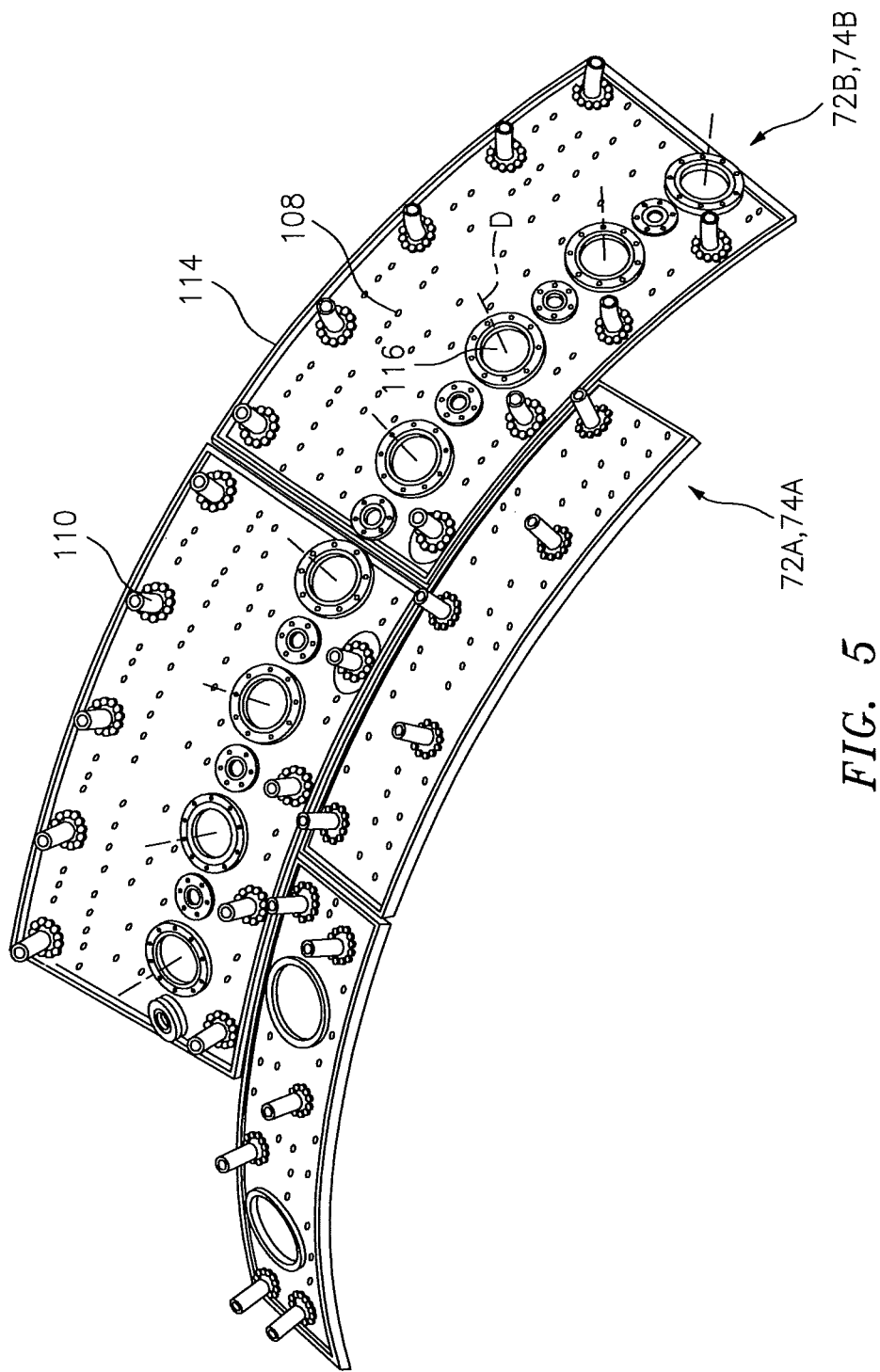
FIG. 5 is a perspective cold side view of a liner panel array of an outer wall assembly.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 through the respective support shells 68, 70 to receive the fasteners 102 at a threaded distal end section thereof to define one or more impingement cavities 106. The liner panels 72, 74 typically include one or more rails 114 (shown partially) that extend from a cold side 110 thereof. The rail 114 extends at least around the periphery of the cold side 110 (see FIG. 5) to interface with their respective support shells 68, 70 when mounted thereto to define the one or more impingement cavities 106. That is, the rails 114 may include further internal rails to define additional compartments.

A multiple of cooling impingement passages 104 penetrate through the support shells 68, 70 to allow air from the respective annular plenums 76, 78 to enter impingement cavities 106 formed within the combustor wall assemblies 60, 62 between the respective support shells 68, 70 and liner panels 72, 74. The cooling impingement passages 104 are generally normal to the surface of the liner panels 72, 74. The air in the cavities 106 provides cold side impingement cooling of the respective liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature combustion gas flow also contributes to effusion film cooling. The combination of impingement passages 104 and effusion passages 108 may be referred to as an Impingement Film Floatwall (IFF) assembly.

The effusion passages 108 allow the air to pass from each cavity 106 defined in part by the cold side 110 of the liner panels 72, 74 to a hot side 112 thereof and facilitate the formation of a relatively thin, cool, insulating blanket of cooling air along the hot side 112. The effusion passages 108 are generally more numerous than the impingement passages 104 to promote the development of a sheath of film cooling along the hot side 112. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through the respective support shells 68, 70 and liner panels 72, 74 along an axis D. For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

At least one of the multiple of dilution passage 116, in one disclosed non-limiting embodiment, is defined by an annular grommet 150 (see FIG. 6) mounted between the respective support shell 68, 70 and associated liner panels 72, 74 along axis D. The annular grommet 150 may be an assembly of a multiple of pieces that are brazed or otherwise mounted to the liner panels 72, 74. Alternatively, the annular grommet 150 may be integral with the liner panel 72, 74 and manufactured via, for example, casting or an additive manufacturing process.

Figure 6:
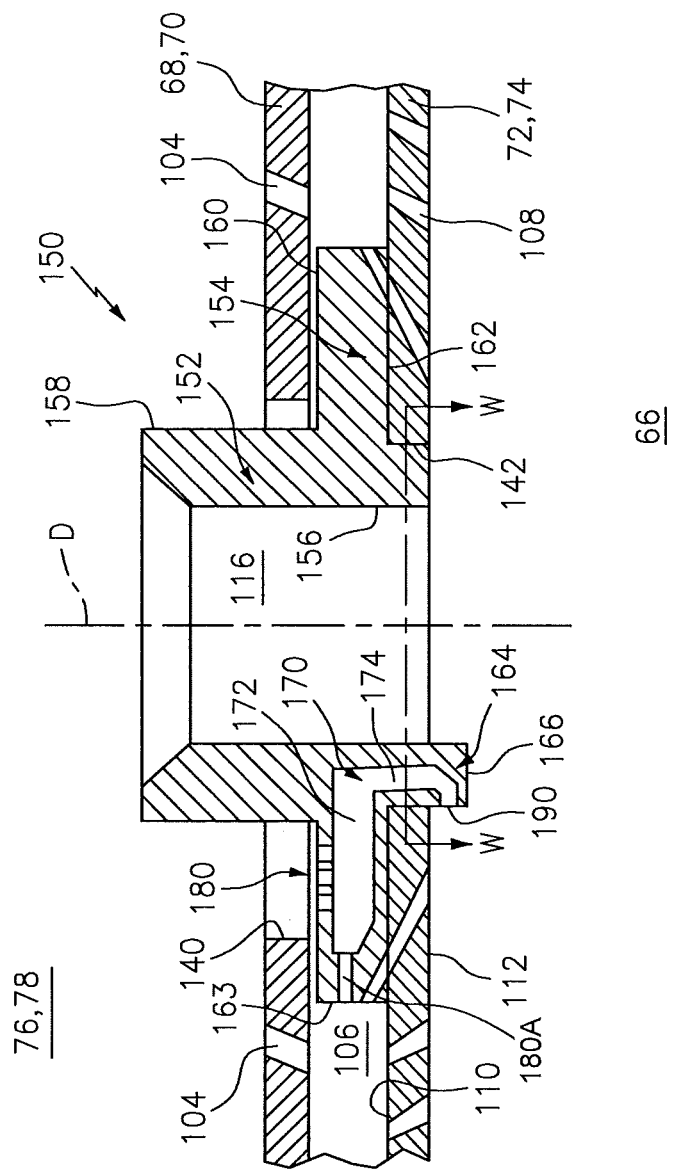
FIG. 6 is a sectional view of an annular grommet according to one disclosed non-limiting embodiment.

With reference to FIG. 6, the annular grommet 150 generally includes a passage wall 152 and a flange wall 154 that extends transversely therefrom. The passage wall 152 extends through the respective support shell 68, 70 and associated liner panels 72, 74 along axis D. The flange wall 154 extends from the passage wall 152 between the respective support shell 68, 70 and associated liner panels 72, 74 to retain each annular grommet 150 in an aperture 140 in the support shell 68, 70 and an aperture 142 in the liner panels 72, 74. It should be appreciated that segregation of the walls 152, 154 herein is but for explanatory purposes and that the annular grommet 150 may be manufactured as a unitary component or as an assembly of a multiple pieces either separate from, or integral with, the associated liner panels 72, 74.

The passage wall 152 is defined by an inner passage wall surface 156 and an outer passage wall surface 158. The inner passage wall surface 156 defines the dilution passage 116 along axis D. The outer passage wall surface 158 defines a periphery smaller than the aperture 140 to accommodate, for example, tolerances and/or operational thermal growth. The flange wall 154 extends transversely from the passage wall 152 and includes an outer flange wall surface 160 and an inner flange wall surface 162 with an edge 163 therebetween. The outer flange wall surface 160 provides an interface surface with the support shell 68, 70 while the inner flange wall surface 162 provides an interface surface with the respective liner panel 72, 74. That is, the flange wall 154 is at least partially sandwiched between the respective support shell 68, 70 and associated liner panels 72, 74.

The passage wall 152 and the flange wall 154 together define a chamber 170 therein. The chamber 170 in this disclosed non-limiting embodiment includes a passage wall chamber portion 172 and a flange wall chamber portion 174 generally transverse thereto in cross-section. The passage wall chamber portion 172 and the flange chamber portion 174 may extend completely or at least partially around the annular grommet 150. That is, the chamber 170 need not extend the full periphery of the annular grommet 150. Further, the passage wall chamber portion 172 and the flange wall chamber portion 174 need not be completely contained within the respective passage wall 152 and the flange wall 154. That is, the passage wall chamber portion 172 and the flange wall chamber portion 174 may be closed-out or otherwise at least partially formed by assembly of the annular grommet 150 into the respective liner panel 72, 74.

An inlet passage 180 communicates airflow from the respective annular plenums 76, 78 into the chamber 170. In one disclosed non-limiting embodiment, the inlet passage 180 extends through the outer flange wall surface 160 of the flange wall 154 that provides an interface surface with the support shell 68, 70. The inlet passage 180 is radially located between an outer edge of the grommet defining the aperture 140 and the passage wall 152 such that the annular grommet 150 need not be centered within the apertures 140, 142 to accommodate, for example, tolerances and thermal growth, but still maintains communication through the inlet passage 180 from the respective annular plenums 76, 78.

In another disclosed non-limiting embodiment, an inlet passage 180A alternatively or additionally communicates airflow from the respective impingement cavity 106 into the chamber 170. It should be appreciated that variously sized inlet passages 180, 180A may be utilized to control the ratio of airflow into the chamber 170.

Figure 7:
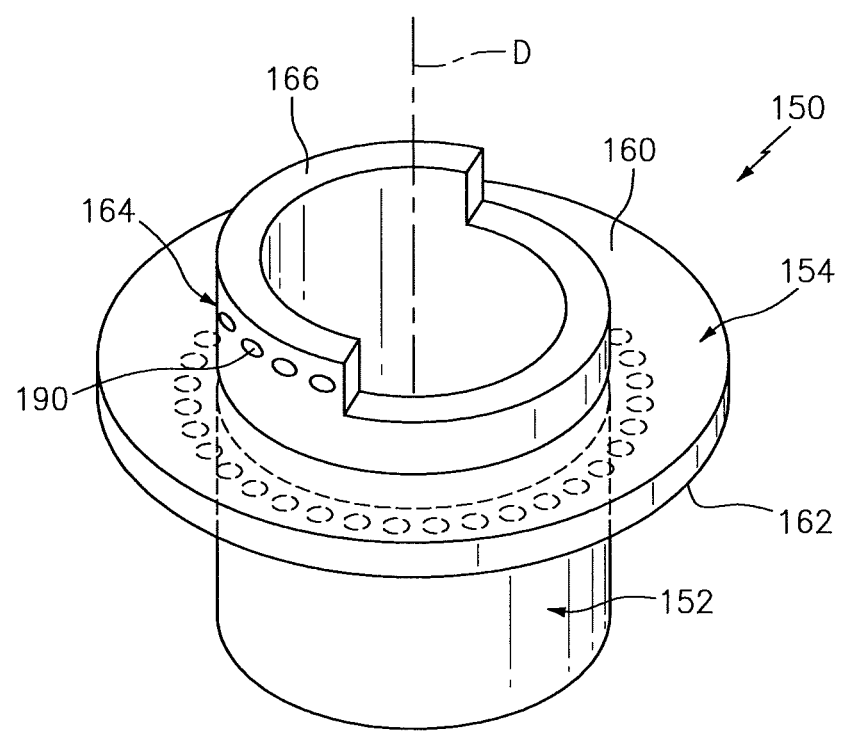
FIG. 7 is a perspective bottom view of the annular grommet according to one disclosed non-limiting embodiment.

Airflow is communicated from the chamber 170, which may be continuous or internally separated, through an outlet passage 190 generally parallel to the respective liner panels 72, 74. That is, the outlet passage 190 is located, in one disclosed non-limiting embodiment, through an axially extended passage wall section 164 of the passage wall 152. The axially extended passage wall section 164 locates the outlet passage 190 axially beyond (e.g., with respect to axis D) the hot side 112 of the respective liner panel 72, 74. In this disclosed non-limiting embodiment, the axially extended passage wall section 164 axially extends beyond the hot side 112 of the respective liner panel 72, 74 for only part of the passage wall 152 circumference. In other words, the axially extended passage wall section 164 does not extend for a full three-hundred and sixty degrees of the passage wall 152 circumference and essentially forms a stepped distal edge 166 (see FIG. 7). The axially extended passage wall section 164 in this disclosed non-limiting embodiment is locally arranged at an area or location which might otherwise become distressed on account of, for example, local separation within the dilution passage 116, that might otherwise result from recirculation of hot gas into the dilution passage 116.

Figure 8:
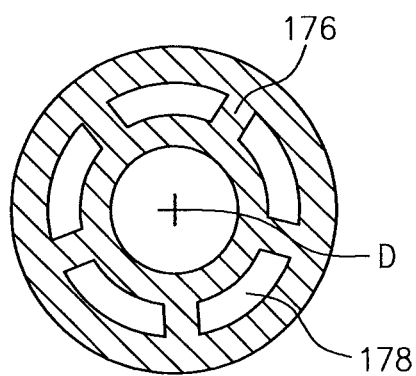
FIG. 8 is a sectional view of chambers defined within the annular grommet taken along line W-W in FIG. 6 according to another disclosed non-limiting embodiment.
Figure 9:
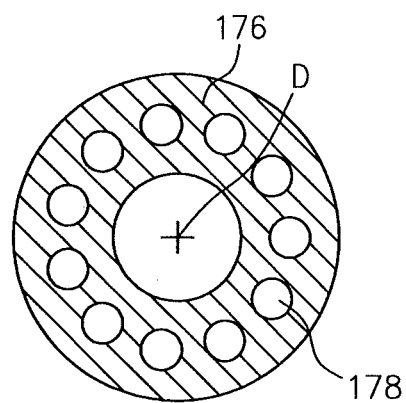
FIG. 9 is a sectional view of chambers defined within the annular grommet taken along line W-W in FIG. 6 according to another disclosed non-limiting embodiment.
Figure 10:
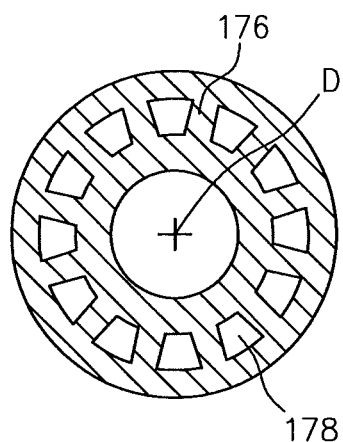
FIG. 10 is a sectional view of chambers defined within the annular grommet taken along line W-W in FIG. 6 according to another disclosed non-limiting embodiment.

The passage wall 152 may be continuous or segmented with respect to the passage wall chamber portion 174. That is, the passage wall chamber portion 174 may itself be defined by a multiple of interior walls 176 (see FIG. 8) which form circumferential chamber segments 178 that may be, for example, circular (see FIG. 9), trapezoidal (see FIG. 10) or another cross-sectional shaped chamber segments 178. Alternatively still, the passage wall chamber portion 174 may be annular (see FIG. 11).

Figure 11:
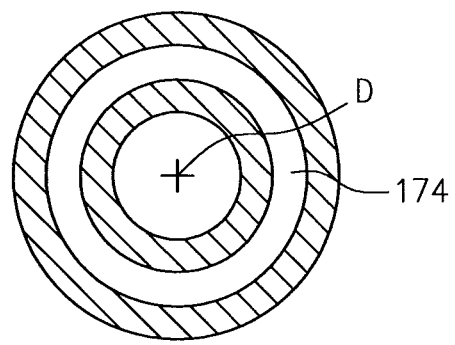
FIG. 11 is a sectional view of a chamber defined within the annular grommet taken along line W-W in FIG. 6 according to another disclosed non-limiting embodiment.
Figure 12:
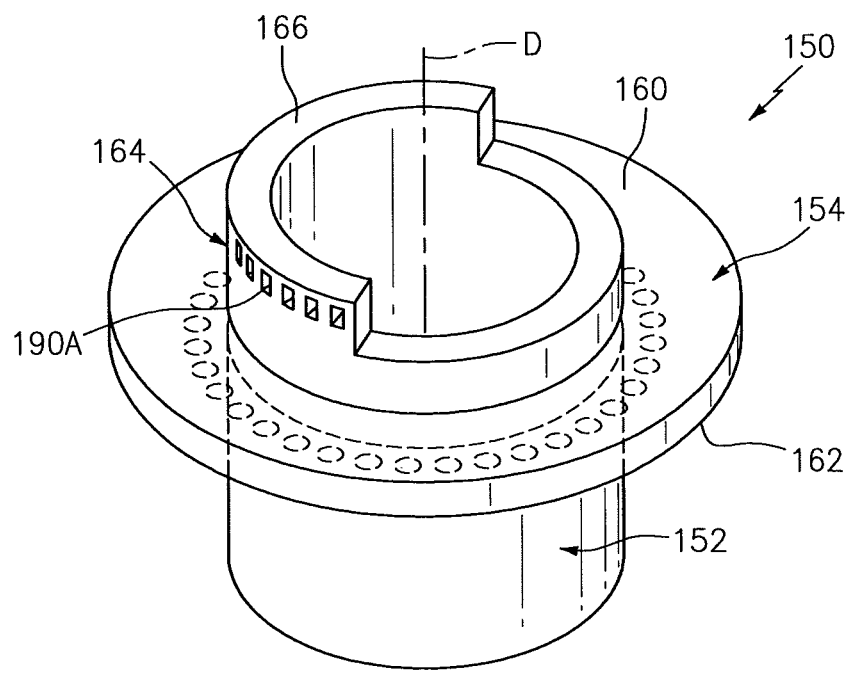
FIG. 12 is a perspective view of the annular grommet according to another disclosed non-limiting embodiment.
Figure 13:
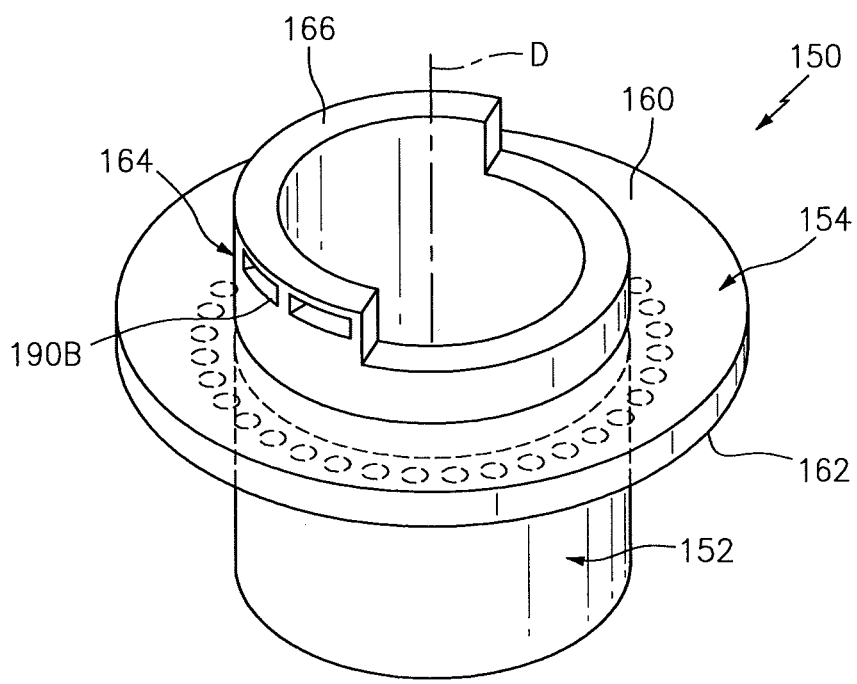
FIG. 13 is a perspective view of the annular grommet according to another disclosed non-limiting embodiment.
Figure 14:
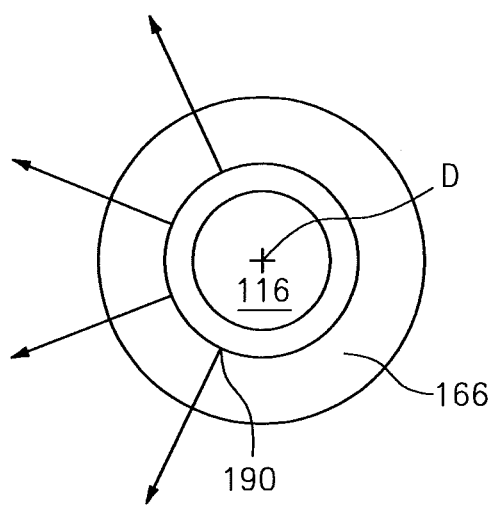
FIG. 14 is an underside view of the annular grommet according to another disclosed non-limiting embodiment.
Figure 15:
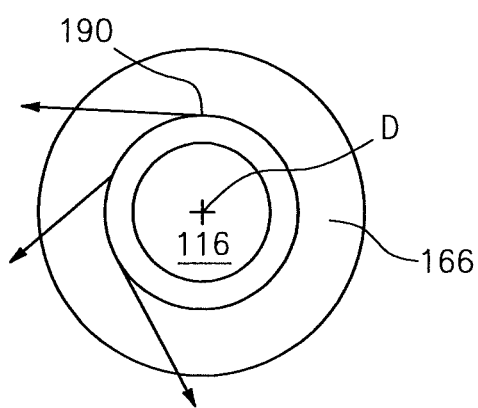
FIG. 15 is an underside view of an annular grommet according to another disclosed non-limiting embodiment.

The outlet passage 190 from the chamber 170 is located in the axially extended passage wall section 164 and may be of various shapes such as a circular 190 (see FIG. 7), slot 190A (see FIG. 12), rectilinear 190B (see FIG. 13) or others as well as completely or partially around the circumference of the passage wall section 164 (see FIG. 11). It should be appreciated that various passage geometries (e.g., diameter, shape, density, surface angle, incidence angle, etc.) and the distributions thereof will benefit herefrom. Further, the outlet passage 190 may be located radially (see FIG. 14) or tangentially (see FIG. 15) with respect to the dilution passage 116 to minimize any potential distressed areas on the respective liner panels 72, 74.

Figure 16:
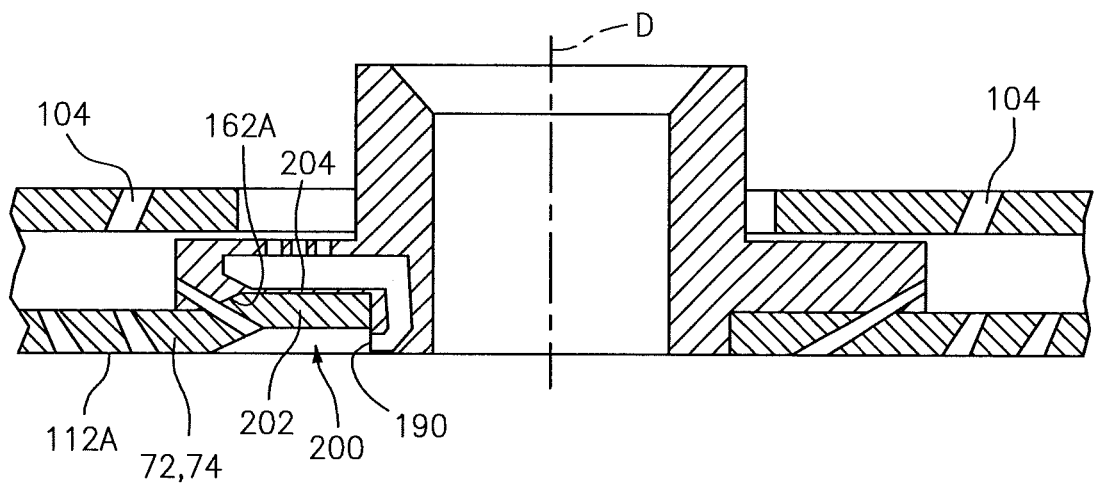
FIG. 16 is a sectional view of an annular grommet according to another disclosed non-limiting embodiment.
Figure 17:
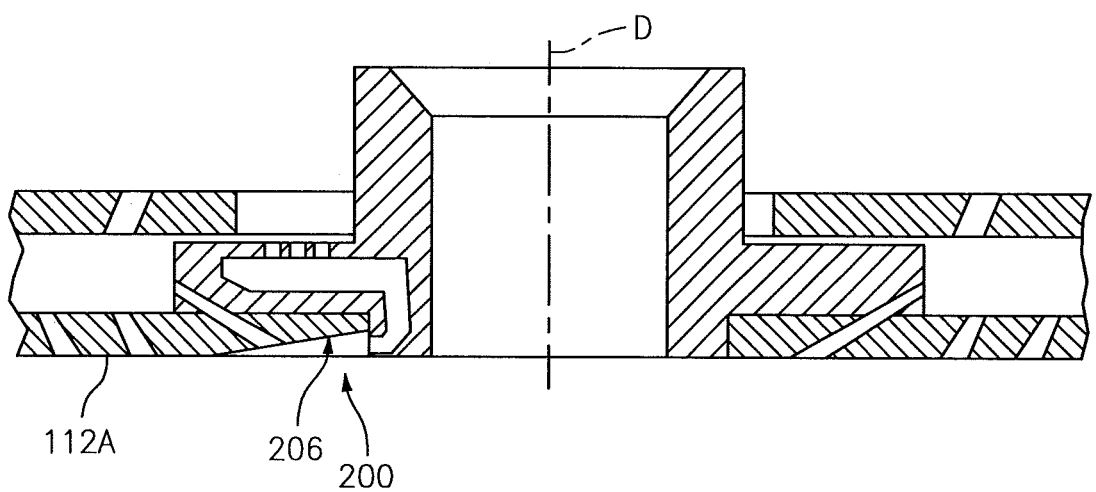
FIG. 17 is a sectional view of an annular grommet according to another disclosed non-limiting embodiment.

With respect to FIG. 16, in another disclosed non-limiting embodiment, the hot side 112A of the respective liner panel 72, 74 and grommet define a recess 200 adjacent to the outlet passage 190. That is, the axially extended passage wall section 164 as above described is not required as the recess 200 accommodates airflow from the outlet passage 190. The recess may be formed via, for example, a stepped area 202 in the hot side 112A and a stepped area 204 in the inner flange wall surface 162A. In another disclosed non-limiting embodiment, the recessed area 200 is defined by a chamfered area 206 in the hot side 112B of the respective liner panel 72, 74 (see FIG. 17). That is, the recessed area 200 permits airflow from the outlet passage 190 without an axially extended passage wall section 164 to, for example, simplify manufacture thereof.

Figure 18:
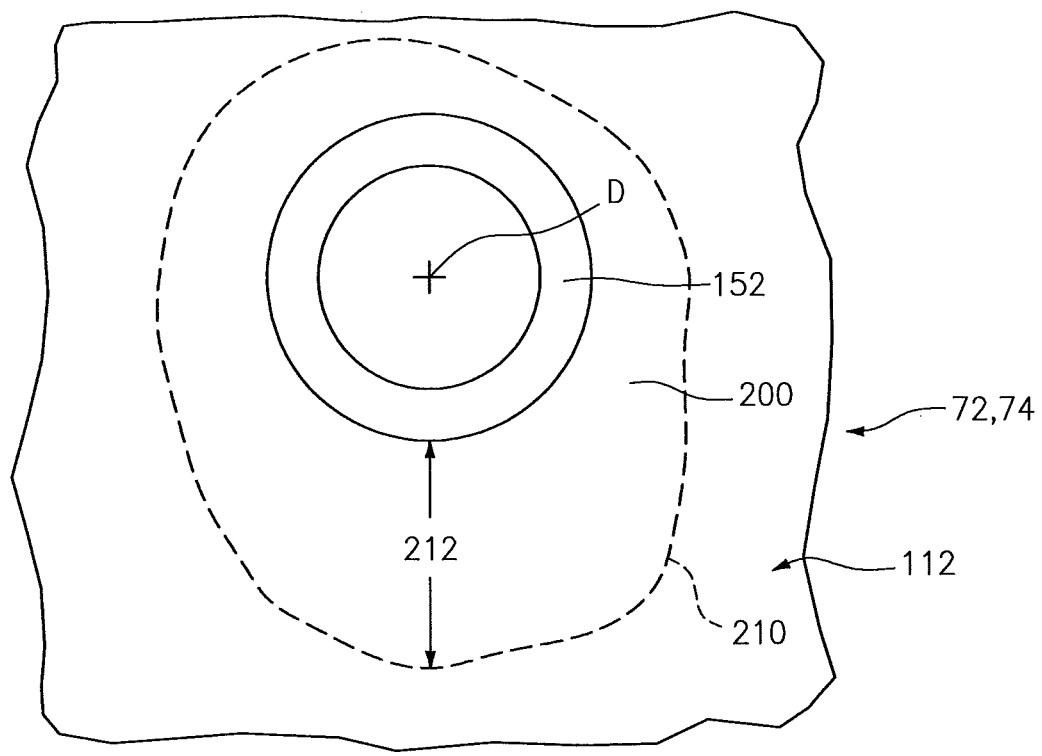
FIG. 18 is a hot side view of a liner panel illustrating a recess according to one disclosed non-limiting embodiment.

With reference to FIG. 18, the recessed area 200 is defined by a periphery 210. A distance 212 from the passage wall 152 defines the periphery 210 of the recessed area 200. The distance 212 may vary around the circumference of the passage wall 152 with respect to, for example, that which might otherwise lead to a distressed area.

Figure 19:
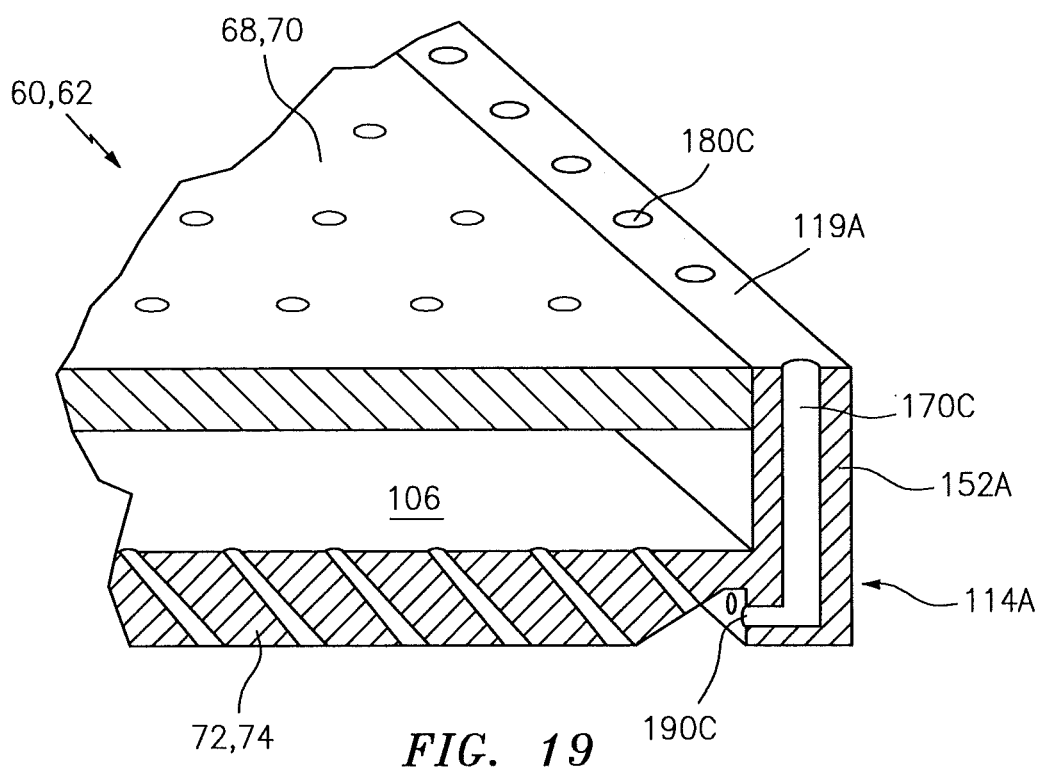
FIG. 19 is a sectional view of a rail according to another disclosed non-limiting embodiment.

With respect to FIG. 19, in another disclosed non-limiting embodiment, the chamber 170 is at least partially defined by a linear rail 114A that closes out the wall assembly 60, 62. It should be appreciated, that the rail may define the perimeter of each of the liner panels 72, 74 and may alternatively or additionally be located at other intermediate positions along the wall assembly 60, 62. In this disclosed non-limiting embodiment, the chamber 170C includes both an inlet passage 180C and outlet passage 190C.

Figure 20:
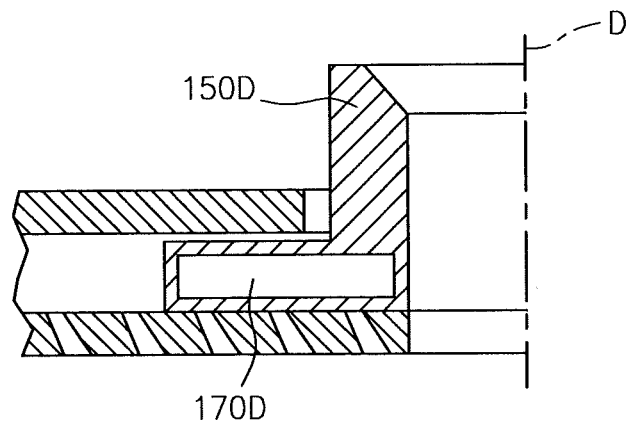
FIG. 20 is a sectional view of an annular grommet according to another disclosed non-limiting embodiment.
Figure 21:
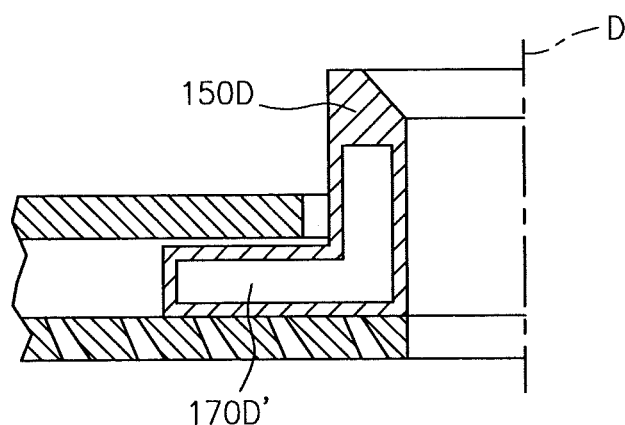
FIG. 21 is a sectional view of an annular grommet according to another disclosed non-limiting embodiment.
Figure 22:
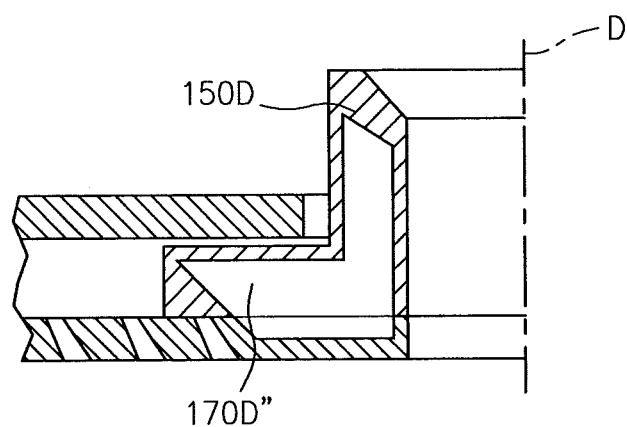
FIG. 22 is a sectional view of an annular grommet according to another disclosed non-limiting embodiment.

With respect to FIG. 20, in another disclosed non-limiting embodiment, a sealed chamber 170D is formed within an annular grommet 150D to modify heat transfer through the annular grommet 150D. That is, the chamber 170D does not include an inlet or outlet but reduces the mass of the annular grommet 150D and thereby reduces the heat sink effect thereof. The chamber 170D may be of various cross-sectional shapes such as rectilinear, L-shaped 170D' (see FIG. 21) or other shape 170D" that is partially formed by the liner panel 72, 74 (see FIG. 22). Further, the chamber 170D may be contiguous about the axis D or may be interrupted such as shown in FIGS. 8-11.

Figure 23:
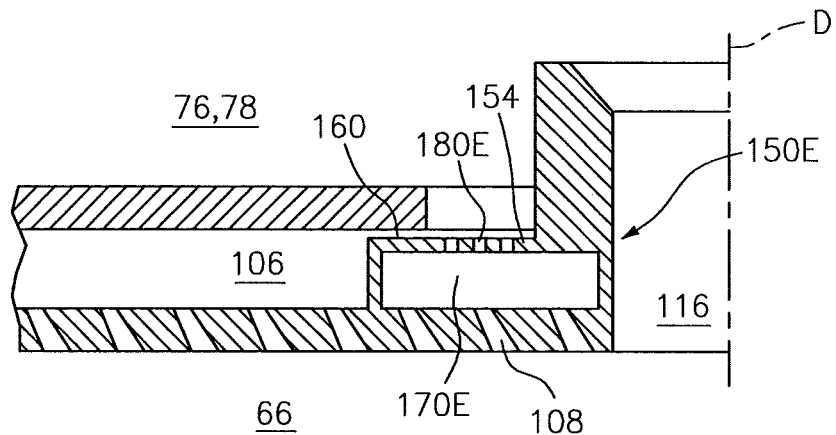
FIG. 23 is a sectional view of an annular grommet according to another disclosed non-limiting embodiment.

With respect to FIG. 23, in another disclosed non-limiting embodiment, the chamber 170E receives airflow from an inlet passage 180E that communicates through the outer flange wall surface 160 of the flange wall 154 as generally described above with respect to FIG. 6. The airflow from within the chamber 170 is communicated to the combustion chamber 66 through the effusion passages 108.

Figure 24:
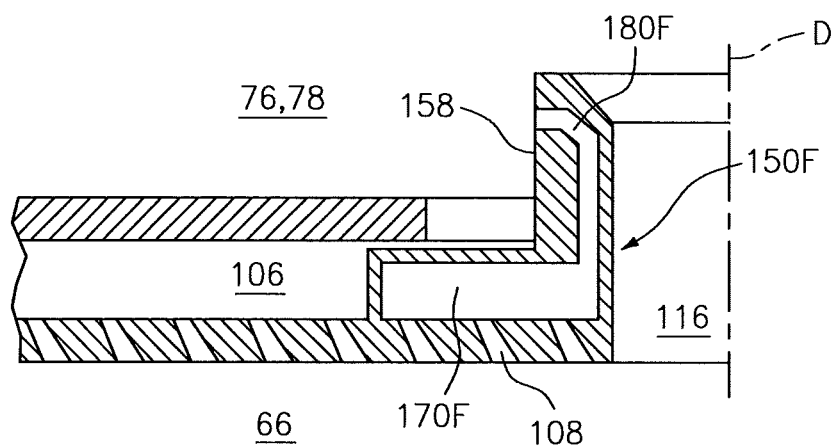
FIG. 24 is a sectional view of an annular grommet according to another disclosed non-limiting embodiment.

With respect to FIG. 24, in another disclosed non-limiting embodiment, an inlet passage 180F communicates through the outer passage wall surface 158 of the passage wall 152 to communicate airflow though the passage wall 152 and into the chamber 170F. That is, the inlet passage 180F is located within a neck region of the annular grommet 150F such that a direct supply of cooling air from the respective annular plenums 76, 78 may be provided. Further, the size and shape of the inlet passage 180F may be less constrained than the inlet passage 180E as positioned in FIG. 23.

Figure 25:
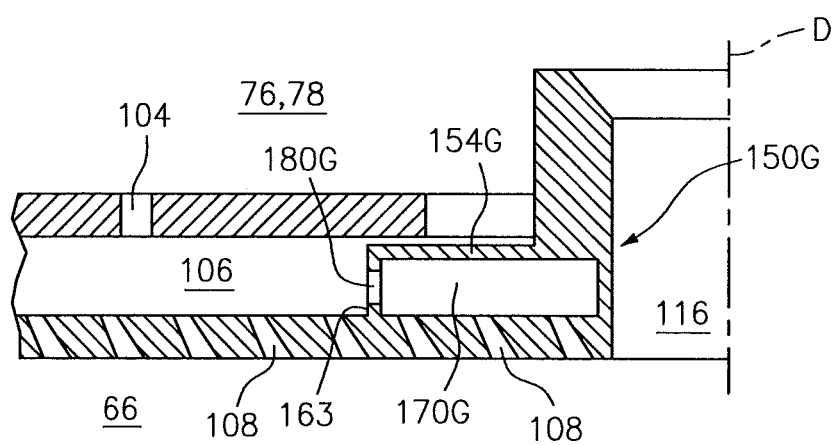
FIG. 25 is a sectional view of an annular grommet according to another disclosed non-limiting embodiment.

With respect to FIG. 25, in another disclosed non-limiting embodiment, the inlet passage 180G extends through the edge 163 of the flange wall 154G to receive airflow from within the impingement cavity 106. That is, the cooling air has already passed through the multiple of cooling impingement passages 104 in the support shells 68, 70 prior to entry into the chamber 170G. A pressure drop may thereby be provided within the cavity 170G with respect to the dilution passage 116 as flow first passes through the cooling impingement passages 104 in the support shells 68, 70.

Figure 26:
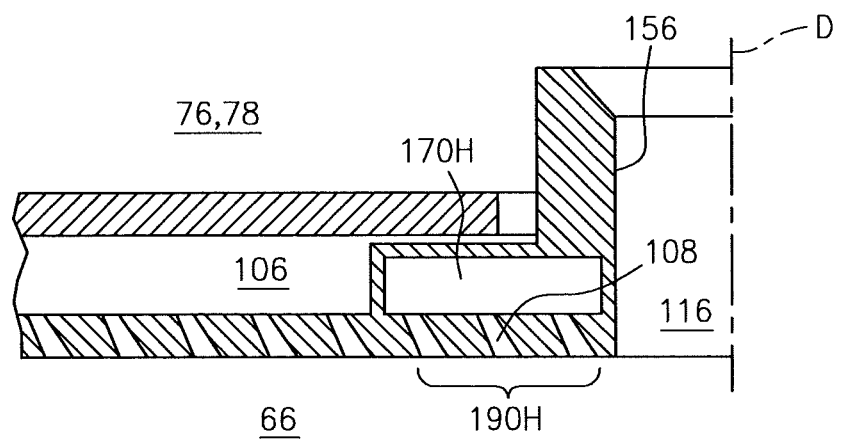
FIG. 26 is a sectional view of an annular grommet according to another disclosed non-limiting embodiment.
Figure 27:
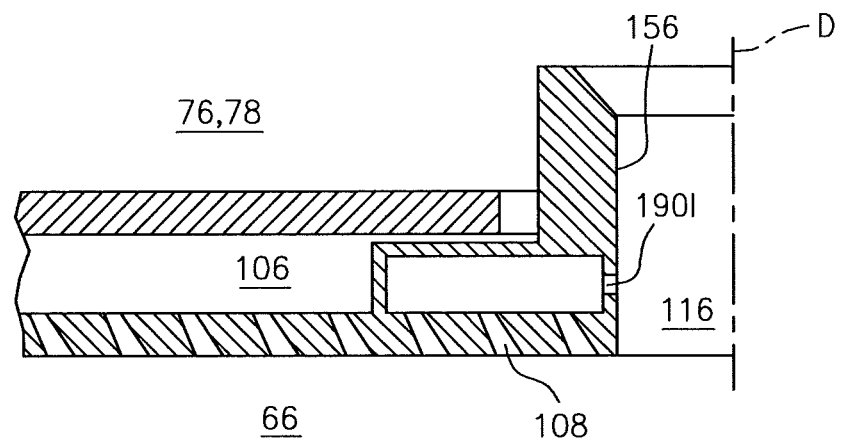
FIG. 27 is a sectional view of an annular grommet according to another disclosed non-limiting embodiment.
Figure 28:
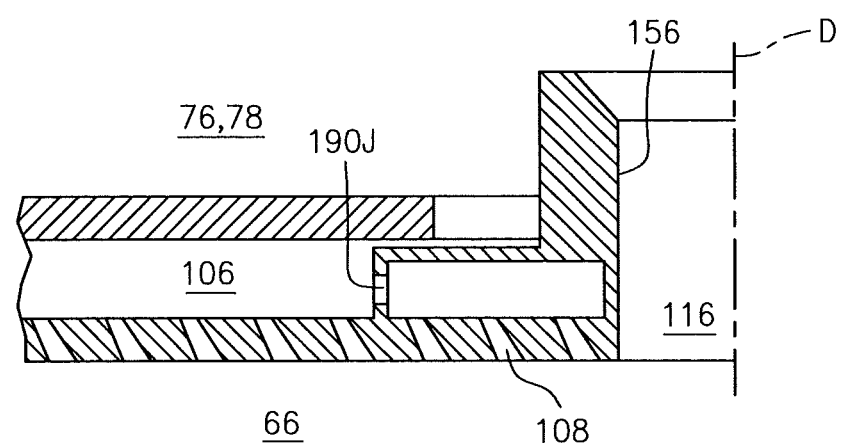
FIG. 28 is a sectional view of an annular grommet according to another disclosed non-limiting embodiment.

With respect to FIG. 26, in another disclosed non-limiting embodiment, the outlet passage 190H from the chamber 170H is formed by the effusion passages 108. That is, the outlets 190H to the combustion chamber 66 from the chamber 170H are via a subset of the effusion passages 108 such that a pressure within the chamber 170 is different than that within impingement cavity 106. In another disclosed non-limiting embodiment, the outlet 190I is directed toward the axis D through the inner passage wall surface 156 (see FIG. 27). In another disclosed non-limiting embodiment, an outlet 190J alternatively or additionally communicates with the impingement cavity 106 (see FIG. 28).

Figure 29:
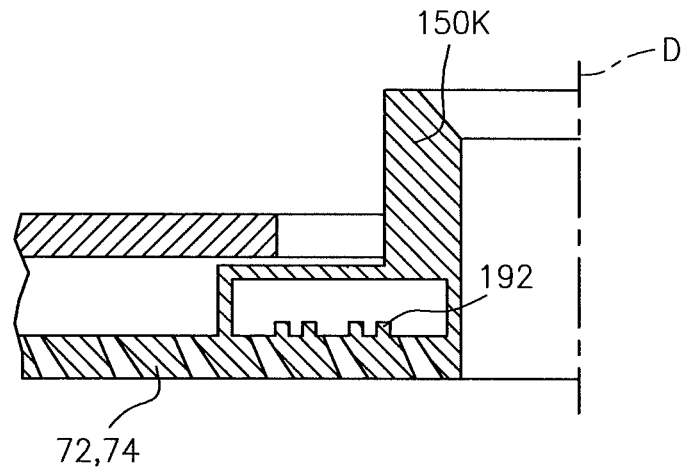
FIG. 29 is a sectional view of an annular grommet according to another disclosed non-limiting embodiment.

With respect to FIG. 29, in another disclosed non-limiting embodiment, the chamber may contain various features 192 such as rails, pins, studs, bumps, ridges and/or other features that may enhance heat transfer through, for example, turbulent flow and convection. The features 192 may be of various shapes and cross-sections and may be formed by the annular grommet 150, the liner panels 72, 74, or both.

Figure 30:
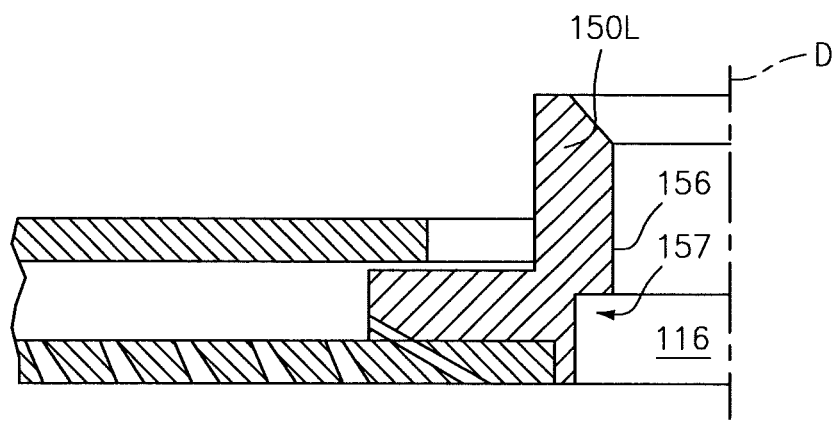
FIG. 30 is a sectional view of an annular grommet according to another disclosed non-limiting embodiment.
Figure 31:
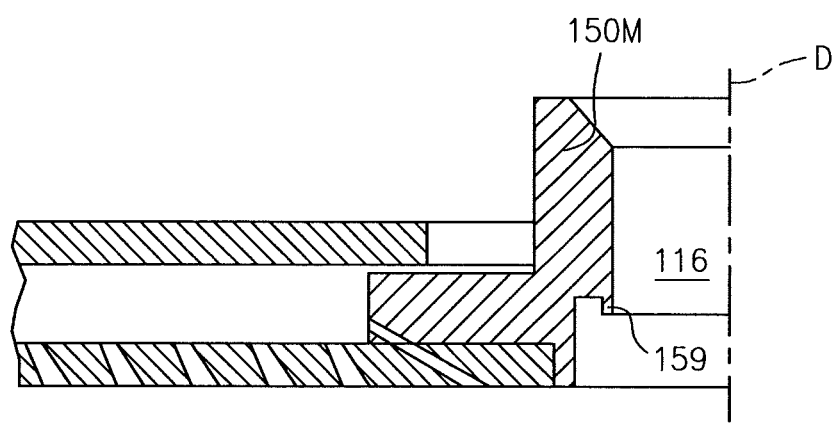
FIG. 31 is a sectional view of an annular grommet according to another disclosed non-limiting embodiment.
Figure 32:
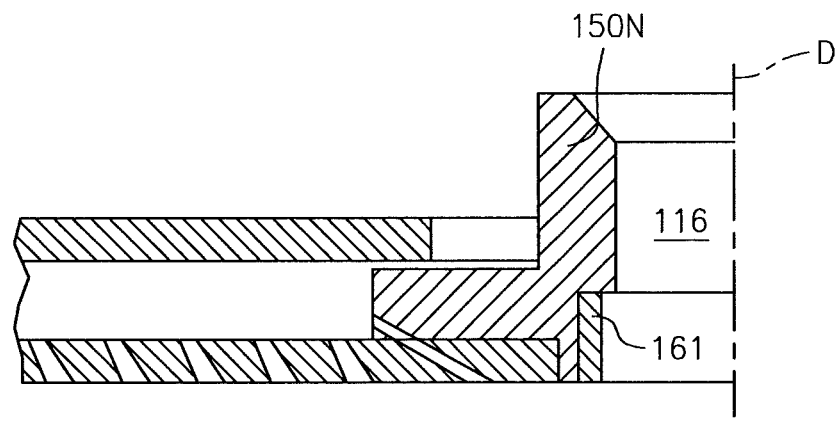
FIG. 32 is a sectional view of an annular grommet according to another disclosed non-limiting embodiment.
Figure 33:
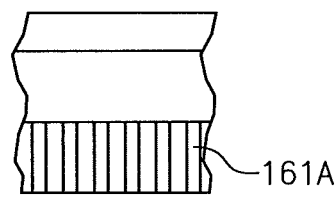
FIG. 33 is a facial view of a feature within an annular grommet according to another disclosed non-limiting embodiment.
Figure 34:
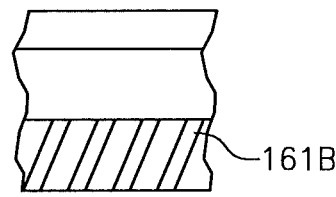
FIG. 34 is a facial view of a feature within an annular grommet according to another disclosed non-limiting embodiment.
Figure 35:
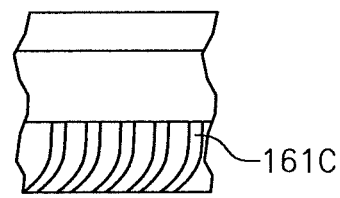
FIG. 35 is a facial view of a feature within an annular grommet according to another disclosed non-limiting embodiment.

With respect to FIG. 30, in another disclosed non-limiting embodiment, an annular grommet 150L includes a stepped feature 157 to form an open cavity within the inner passage wall surface 156 to at least partially surround the dilution passage 116 to further control the dilution air flow through the dilution passage 116. The stepped feature 157, for example, may be located only partially around the circumference of the passage wall 152 with respect to, for example, that which might otherwise lead to a distressed area. That is, the stepped feature 157 may be interrupted and the height, depth and cross-sectional shape of the stepped feature 157 may vary around the circumference of the inner passage wall surface 156. Additionally, the stepped feature 157 may, in another disclosed non-limiting embodiment, be partially enclosed by a shelf 159 that extends axially (see FIG. 31) and/or includes various axial features 161 (see FIG. 32). The axial features 161 may be aligned with axis D 161A (see FIG. 33), angled 161B (see FIG. 34), curved (see FIG. 35) or of other configurations such as arcuate 161C within the cavity that at least partially surrounds the dilution passage 116.

Figure 36:
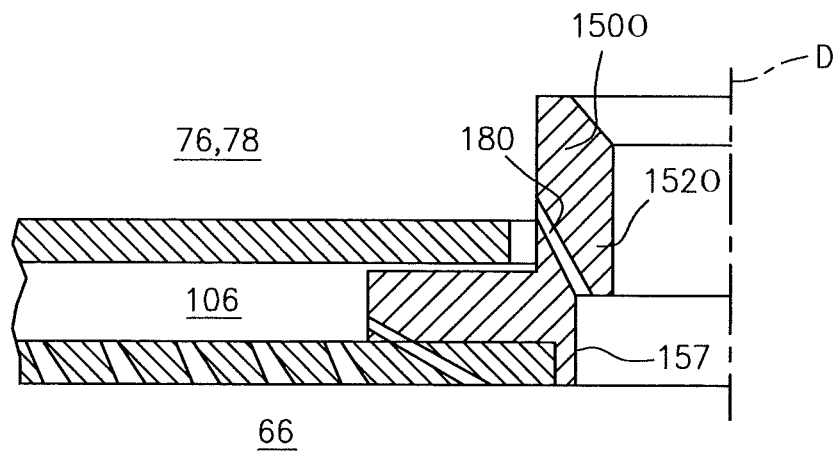
FIG. 36 is a sectional view of an annular grommet according to another disclosed non-limiting embodiment.

With respect to FIG. 36, in another disclosed non-limiting embodiment, an inlet passage 1800 extends through the passage wall 1520 into the stepped feature 157. That is, the cooling air is sourced from the respective annular plenums 76, 78.

Figure 37:
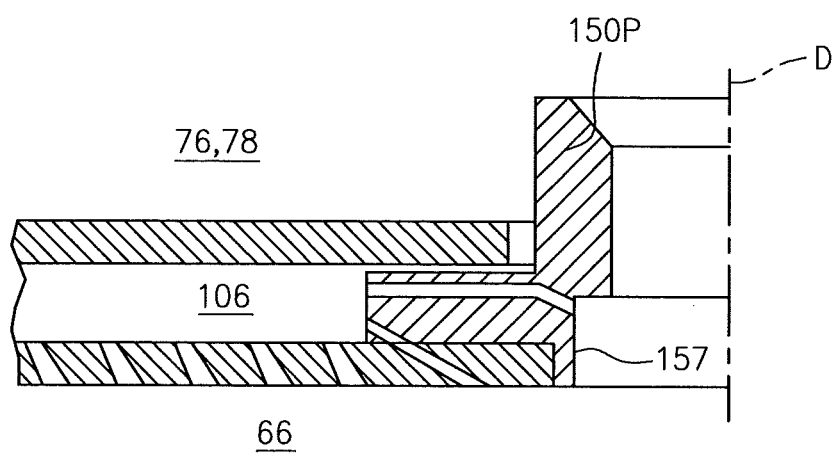
FIG. 37 is a sectional view of an annular grommet according to another disclosed non-limiting embodiment.

With respect to FIG. 37, in another disclosed non-limiting embodiment, the inlet passage 180P extends from within the impingement cavity 106 into the stepped feature 157. That is, the cooling air is sourced from within the impingement cavity 106.

Figure 38:
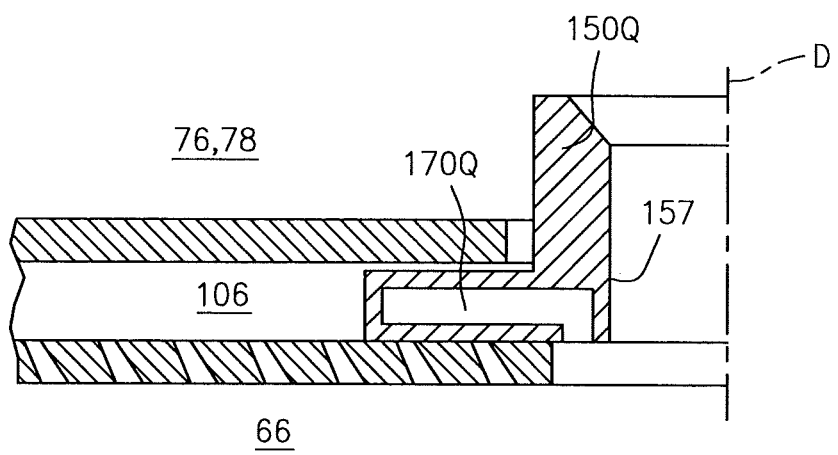
FIG. 38 is a sectional view of an annular grommet according to another disclosed non-limiting embodiment.

With respect to FIG. 38, in another disclosed non-limiting embodiment, the chamber 170Q is open to the combustion chamber 66 to facilitate heat transfer thereto.

The cavity formed within the annular grommet readily increase durability, lowers repair cost and increases time on wing.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A wall assembly within a gas turbine engine, comprising: a shell; and
 a liner panel attached to the shell, the liner panel comprising a hot side and a cold side, the hot side forming a radial peripheral boundary of a combustion chamber; and
 a grommet comprising a passage wall and a flange wall transverse to the passage wall, and the flange wall is between the liner panel and the shell;
 the passage wall at least partially forming a dilution passage along an axis;
 the passage wall and the flange wall at least partially forming a grommet chamber that at least partially surrounds the dilution passage; and
 a section of the grommet projecting along the axis away from the hot side and into the combustion chamber, and the section of the grommet extending partially circumferentially around the axis between opposing circumferential ends of the section of the grommet;
 wherein the section of the grommet defines a perimeter of less than three hundred and sixty degrees;
 wherein the section of the grommet extends radially relative to the axis between an inner surface and an outer surface;
 wherein the section of the grommet is configured with an outlet passage that fluidly couples the grommet chamber with the combustion chamber; and
 wherein the outlet passage is located in the outer surface and spaced from the hot side.

2. The wall assembly of claim 1, wherein
 the section of the grommet projects in a first direction along the axis away from the hot side and into the combustion chamber; and
 a section of the passage wall projects in a second direction along the axis out from the flange wall, and the second direction is opposite the first direction.

3. The wall assembly of claim 1, wherein
 the passage wall has a first end and a second end;
 the passage wall extends along the axis between the first end and the second end;
 the flange wall is disposed a non-zero first distance from the first end; and
 the flange wall is disposed a non-zero second distance from the second end.

4. The wall assembly of claim 1, wherein a portion of the grommet chamber within the passage wall extends partially around the axis between opposing circumferential end surfaces.

5. The wall assembly of claim 1, wherein the flange wall is configured with an inlet passage that extends radially relative to the axis through a section of the flange wall to the grommet chamber.

6. The wall assembly of claim 1, wherein
 the passage wall and the flange wall at least partially form a second grommet chamber circumferentially adjacent the grommet chamber; and
 the second grommet chamber partially surrounds the dilution passage.

7. A wall assembly within a gas turbine engine, comprising: a shell; and
 a liner panel attached to the shell, the liner panel comprising a hot side and a cold side, the hot side forming a radial peripheral boundary of a combustion chamber; and
 a grommet with a passage wall and a flange wall transverse to the passage wall, and the flange wall is between the liner panel and the shell;
 wherein the grommet at least partially defines
 a dilution passage along an axis; and
 at least one grommet chamber that at least partially surrounds the dilution passage;
 wherein the at least one grommet chamber includes an outlet passage transverse to the passage wall and adjacent to the hot side;
 wherein the outlet passage is defined through an axially extended passage wall section of the passage wall that extends beyond the hot side and into the combustion chamber;
 wherein the axially extended passage wall section projects along the axis away from the hot side and into the combustion chamber, and the axially extended passage wall section extends partially circumferentially around the axis between opposing circumferential ends of the axially extended passage wall section;
 wherein the axially extended passage wall section defines a perimeter of less than three hundred and sixty degrees; and
 wherein the outlet passage is located in an outer surface of the axially extended passage wall section and spaced from the hot side.

* * * * *